United States Patent [19]
Yamada

[11] Patent Number: 5,931,475
[45] Date of Patent: Aug. 3, 1999

[54] METAL LAMINATE GASKET WITH MUTUAL LAMINATING PORTIONS

[75] Inventor: Yoshio Yamada, Utsunomiya, Japan

[73] Assignee: Ishikawa Gasket Co., Ltd., Tokyo, Japan

[21] Appl. No.: 08/858,441

[22] Filed: May 19, 1997

[30] Foreign Application Priority Data

May 22, 1996 [JP] Japan ..................................... 8-126688

[51] Int. Cl.⁶ .............................. F16J 15/08; F16J 15/02
[52] U.S. Cl. ........................ 277/591; 277/593; 277/598; 277/600; 277/601
[58] Field of Search ................................... 277/591, 593, 277/598, 600, 601

[56] References Cited

U.S. PATENT DOCUMENTS

| | | | |
|---|---|---|---|
| 4,272,085 | 6/1981 | Fujikawa et al. | 277/597 X |
| 4,369,980 | 1/1983 | Backlin | 277/601 X |
| 4,397,472 | 8/1983 | Czernik | 277/601 X |
| 4,405,138 | 9/1983 | Skrycki | 277/600 |
| 4,765,633 | 8/1988 | Hossack | 277/600 |
| 4,776,073 | 10/1988 | Udagawa . | |
| 4,938,488 | 7/1990 | Udagawa et al. . | |
| 5,058,908 | 10/1991 | Udagawa . | |
| 5,201,534 | 4/1993 | Miyaoh | 277/601 X |
| 5,215,315 | 6/1993 | Belter | 277/597 |
| 5,280,929 | 1/1994 | Miyaoh et al. | 277/600 X |
| 5,340,126 | 8/1994 | Antonini et al. | 277/601 |
| 5,460,387 | 10/1995 | Miyaoh et al. | 277/601 |
| 5,683,092 | 11/1997 | Ito et al. | 277/601 |

FOREIGN PATENT DOCUMENTS 0 580 427  1/1994  European Pat. Off. .

*Primary Examiner*—Eileen Dunn Lillis
*Assistant Examiner*—William Ackerman
*Attorney, Agent, or Firm*—Kanesaka & Takeuchi

[57] ABSTRACT

A metal laminate gasket of the invention is formed of first and second metal plates and an annular plate. The first metal plate has a base portion, a curved portion extending from the base portion to define a first opening corresponding to a hole of the engine to be sealed, and a flange extending from the curved portion and situated over the base portion. The annular plate is situated between the flange and the base portion and has the width at least partly shorter than that of the flange. The second metal plate is situated over the first metal plate at a side where the flange is located. The second metal plate has a second opening at least partly smaller than an outer diameter of the flange, and an edge portion around the second opening. The edge portion of the second plate is at least partly retained between the flange and the base portion. Thus, the first and second metal plates are assembled together with the annular plate.

7 Claims, 1 Drawing Sheet

METAL LAMINATE GASKET WITH MUTUAL LAMINATING PORTIONS

BACKGROUND OF THE INVENTION AND RELATED ART STATEMENT

The invention relates to a metal laminate gasket with mutual laminating portions around a hole to be sealed.

An internal combustion engine has been developed to provide high power and light weight. A cylinder head gasket installed between a cylinder head and a cylinder block has been developed to satisfy the requirement of the engine. Since a metal laminate gasket is strong against high temperature, the metal laminate gasket has been used widely.

In order to form a light weight gasket, it is preferable to reduce a number of metal plates laminated together. Therefore, a metal gasket formed of two metal plates has been used.

When a metal laminate gasket is formed of two metal plates, one metal plate may be turned around a hole to be sealed to provide a flange around the hole. In this case, the flange is generally laminated directly over a base portion of the one metal plate without laminating over the other metal plate, because the thickness of the gasket at the flange is not increased, or the other plate is used as a surface pressure regulating plate for a curved portion between the flange and the base portion. In the later case, the other plate must have a thickness equal to or greater than that of the flange, and the flange and the other plate can not be laminated together. This kind of gasket is shown in U.S. Pat. No. 4,938,488.

When the two plates are simply laminated, the two plates are easily disassembled, so that the two plates must be connected together by other means, such as spot welding.

On the other hand, when a metal gasket requires a high surface pressure around a hole to be sealed, a surface pressure regulation plate or shim may be fixed around the hole (U.S. Pat. No. 4,776,073). A metal ring may be formed between a flange and a base portion of one metal plate to provide a certain thickness therebetween around a hole (U.S. Pat. No. 5,058,908).

The above patents operate as intended. However, in a thin metal laminate gasket, it is desirable to connect the metal plates easily without a spot welding or other special means.

Accordingly, one object of the invention is to provide a metal laminate gasket, wherein two metal plates can be easily connected together.

Another object of the invention is to provide a metal laminate gasket as stated above, wherein a surface pressure around a hole to be sealed can be regulated easily.

A further object of the invention is to provide a metal laminate gasket as stated above, wherein the appearance of the gasket is improved.

Further objects and advantages of the invention will be apparent from the following description of the invention.

SUMMARY OF THE INVENTION

A metal laminate gasket of the invention is used for an internal combustion engine having at least one hole to be sealed. The gasket is basically formed of a first metal plate, an annular plate and a second metal plate.

The first metal plate includes a base portion, a curved portion extending from the base portion to define a first opening corresponding to the hole of the engine, and a flange extending from the curved portion and situated over the base portion. The annular plate is situated between the flange and the base portion outside the curved portion relative to the first opening. The annular plate has a width or radial length at least partly shorter than that of the flange.

The second metal plate is situated over the first metal plate at a side where the flange is located. The second metal plate has a second opening at least partly smaller than the outer diameter of the flange situated around the first opening, and an edge portion around the second opening. When the gasket is assembled, the edge portion of the second plate is at least partly retained between the flange and the base portion.

Since the edge portion of the second metal plate is held between the flange and the base portion, the first and second metal plates are connected together. Also, the appearance of the gasket is improved because there is no gap between the flange and the second metal plate. Further, when the thickness of the annular plate is adjusted, the surface pressure formed around the hole can be adjusted easily.

The annular plate has a thickness equal to or less than that of the second metal plate. If the thickness of the annular plate is substantially equal to that of the second metal plate, the second metal plate may be simply held between the flange and the base portion.

If the thickness of the annular plate is thinner than that of the second metal plate, the edge portion of the second metal plate partly retained between the flange and the base portion is processed or thinned to have a thickness substantially the same as that of the annular plate. As a result, the second plate can be properly retained between the flange and the base portion.

The annular plate may have a plurality of first notches and first projections alternately arranged with each other and oriented radially outwardly of the annular plate. Also, the edge portion of the second metal plate has a plurality of second notches and second projections alternately arranged with each other and oriented radially inwardly in the second opening. The first notches and projections engage the second projections and notches, respectively. Therefore, the annular plate is immovably fixed to the second metal plate.

Preferably, the second projections of the second metal plate are located between the flange and the base portion. The thickness of the second projections is less than that of the other portion of the second metal plate, and is substantially equal to the thickness of the annular plate.

DETAILED DESCRIPTION OF A PREFERRED EMBODIMENT

Figure 1:
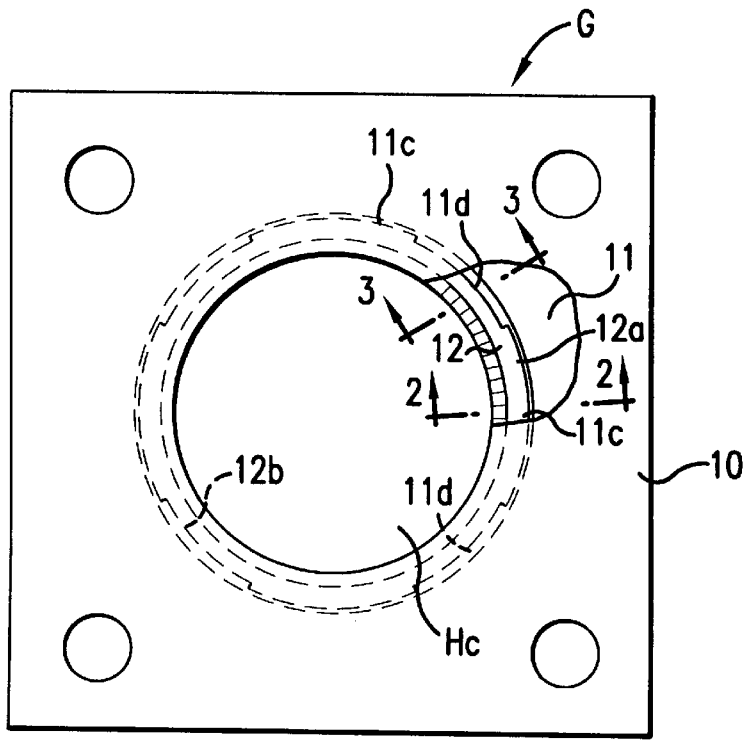
FIG. 1 is a partially cut explanatory plan view of a metal laminate gasket of the invention.
Figure 2:
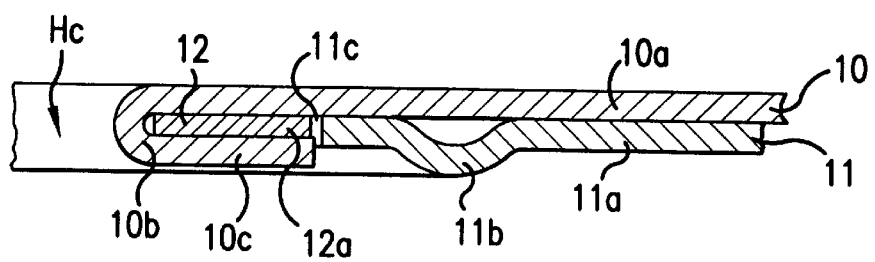
FIG. 2 is an enlarged sectional view taken along line 2—2 in FIG. 1.
Figure 3:
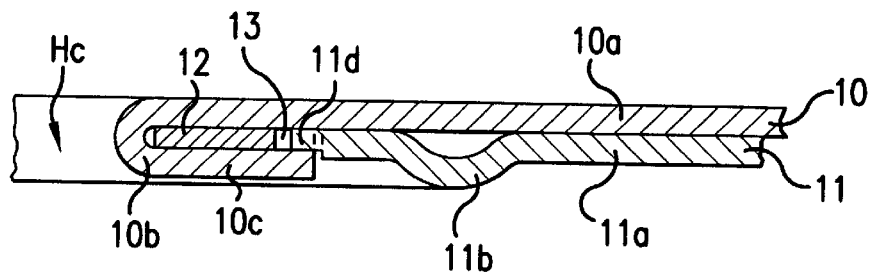
FIG. 3 is an enlarged sectional view taken along line 3—3 in FIG. 1.

A gasket G of the invention as shown in the drawings is a cylinder head gasket and is situated between a cylinder head and a cylinder block (both not shown). Since the gasket G in FIG. 1 is shown for an explanatory purpose, only one cylinder bore Hc is shown in FIG. 1, and other holes, such as water holes and oil holes, are omitted.

The gasket G is formed of an upper plate 10, a lower plate 11, and an annular ring 12.

The upper plate 10 includes a base portion 10a extending substantially throughout an entire area of the gasket, a curved portion 10b extending from the base portion 10a, and a flange 10c extending from the curved portion 10b and disposed over the base portion 10a. The curved portion 10b defines the cylinder bore Hc.

The lower plate 11 includes a base or main portion 11a, and a hole 13 greater than the cylinder bore Hc. A bead 11b is formed around the hole 13 to seal the cylinder bore Hc outside the flange 10c. The lower plate 11 further includes four notches 11c and four projections 11d alternately arranged around the hole 13 inside the base portion 11a. When the upper and lower plates 10, 11 are assembled together, the projections 11d are located under the flange 10c. Namely, the projections 11d are held between the base portion 10a and the flange 10c.

The annular ring 12 has an inner diameter slightly greater than the outer diameter of the curved portion 10b, and a width substantially the same as that of the flange 10c. The annular ring 12 is located between the flange 10c and the base portion 10a to be retained therebetween.

The annular ring 12 further includes four projections 12a and four notches 12b alternately arranged around the outer edge of the annular ring 12. The notches 12b are located above the flange 10c. The projections 12a are also located above the flange 10c, but the projections 12a may slightly project radially outwardly beyond the flange 10c.

The projections 12a and the notches 12b have the sizes to match the notches 11c and the projections 11d, respectively. When the annular ring 12 is assembled with the lower plate 11, the projections 12a engage the notches 11c, and the notches 12b engage the projections 11d. As a result, the annular ring 12 does not rotate inside the hole 13.

The annular ring 12 has a thickness less than the thicknesses of the upper and lower plates 10, 11. When the projections 11d are located between the flange 10c and the base portion 10, the projections 11d located therebetween must have the thickness as that of the annular ring 12. Therefore, the projections 11d extending from the base portion 11a are pressed or coined to have the thickness as that of the annular ring 12.

In case the thickness of the annular ring 12 is slightly less than that of the lower plate 11, if the difference of the thickness therebetween is within a tolerance which may be deformed when the gasket is compressed, the thicknesses of the projections 11d need not be adjusted.

When the gasket 10 is assembled, before the curved portion 10b is formed or turned relative to the base portion 10a, the lower plate 11 and the annular ring 12 are laminated over the base portion 10a. In this condition, the notches 11c and projections 11d of the lower plate 11 engage the projections 12a and notches 12b, respectively. Thereafter, the curved portion 10b is formed so that the flange 10c is located over the annular ring 12 and the projections 11d of the lower plate 11. After assembly, the lower plate 11 and the annular ring 12 are securely fixed to the upper plate. The gasket G does not accidentally disassembled.

When the gasket G is situated between the cylinder head and the cylinder block and is tightened, the gasket is compressed to seal around the cylinder bore Hc. The flange 10c provides a surface pressure without resiliency, but the bead 11b provides a resilient surface pressure. The gasket can securely seal around the cylinder bore Hc.

In the above embodiment, the lower plate 11 and the annular ring 12 include the notches and projections engaging with each other. However, the notches and projections may be omitted, and an edge of the lower plate may be disposed between the flange and the base portion of the upper plate, so that the lower plate is assembled with the upper plate.

In the invention, when it is required to change the surface pressure around the cylinder bore Hc, the annular ring with a different thickness may be installed. Thus, the surface pressures around the cylinder bores can be easily adjusted. It is not necessary to change the thickness of the upper and lower plates for changing the surface pressure. If the thickness of the annular ring is changed, the surface pressure of the bead 11b is changed as well.

While the invention has been explained with reference to the specific embodiment of the invention, the explanation is illustrative, and the invention is limited only by the appended claims.

What is claimed is:

1. A metal laminate gasket for an internal combustion engine having at least one hole to be sealed, comprising:

a first metal plate having a base portion extending substantially throughout an entire area of the gasket, a curved portion extending from the base portion to define a first opening, in the base portion to be sealed, and a flange extending from the curved portion and situated over the base portion, an annular plate situated between the flange and the base portion radially outward of the curved portion relative to the first opening, said annular plate having a radial length at least partly shorter than a width of the flange, and an equal thickness throughout an entire area thereof, and a second metal plate situated over the base portion of the first metal plate at a side where the flange is located, said second metal plate having a main portion with a thickness greater than that of the annular plate, a second opening at least partly smaller than an outer diameter of the flange, and an edge portion around the second opening located radially inward of the main portion, said edge portion of the second plate being at least partly retained between the flange and the base portion and having a thickness substantially the same as the thickness of the annular plate.

2. A metal laminate gasket according to claim 1, wherein said annular plate has a plurality of first notches and first projections alternately arranged with each other and oriented radially outwardly from of the annular plate, and said edge portion of the second metal plate has a plurality of second notches and second projections alternately arranged with each other and oriented radially inwardly from the second metal plate in the second opening, said first notches and projections engaging the second projections and notches respectively.

3. A metal laminate gasket according to claim 2, wherein said second projections of the second metal plate are located between the flange and the base portion.

4. A metal laminate gasket according to claim 3, wherein said second projections have thicknesses less than the thickness of the main portion of the second metal plate and substantially equal to the thickness of the annular plate.

5. A metal laminate gasket according to claim 4, wherein said second metal plate has a bead extending around the second opening and projecting in a direction away from the first metal plate.

6. A metal laminate gasket according to claim 2, wherein said annular plate is a flat plate having said first notches and first projections alternately formed at an entire outer periphery between flat surfaces thereof.

7. A metal laminate gasket according to claim 6, wherein said second notches and second projections are formed at an entire inner periphery of the second metal plate around the second opening.

* * * * *

UNITED STATES PATENT AND TRADEMARK OFFICE
CERTIFICATE OF CORRECTION

PATENT NO : 5,931,475
DATED : August 3, 1999
INVENTOR(S): Yoshio Yamada

It is certified that error appears in the above-identified patent and that said Letters Patent is hereby corrected as shown below:

In column 4, line 41, change "from of" to --from--.

Signed and Sealed this

Twenty-eighth Day of December, 1999

Attest:

Q. TODD DICKINSON

*Attesting Officer*     *Acting Commissioner of Patents and Trademarks*